(No Model.)

I. BROOKE.
NUT LOCK.

No. 330,674. Patented Nov. 17, 1885.

WITNESSES:
A. P. Grant,
W. F. Kircher

INVENTOR:
Isaac Brooke
BY John A. Wiedersheim
ATTORNEY.

N. PETERS, Photo-Lithographer, Washington, D. C.

UNITED STATES PATENT OFFICE.

ISAAC BROOKE, OF POTTSTOWN, PENNSYLVANIA.

NUT-LOCK.

SPECIFICATION forming part of Letters Patent No. 330,674, dated November 17, 1885.

Application filed September 18, 1884. Serial No. 143,418. (No model.)

*To all whom it may concern:*

Be it known that I, ISAAC BROOKE, a citizen of the United States, residing at Pottstown, in the county of Montgomery, State of Pennsylvania, have invented a new and useful Improvement in Nut-Fasteners, which improvement is fully set forth in the following specification and accompanying drawings, in which—

Figure 1:
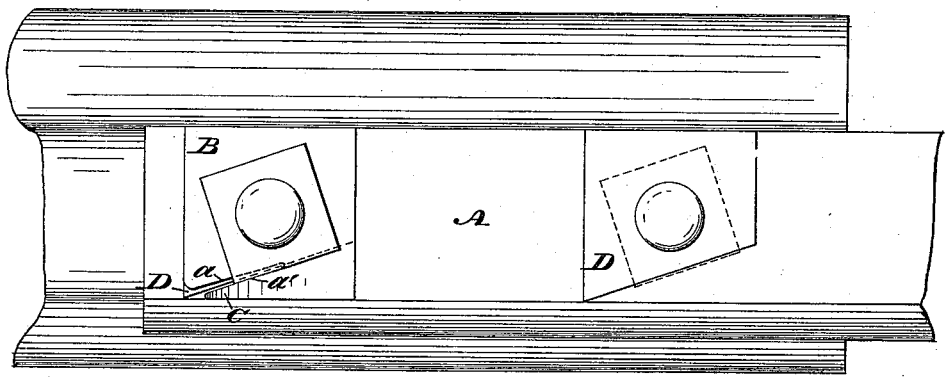
Figure 2:
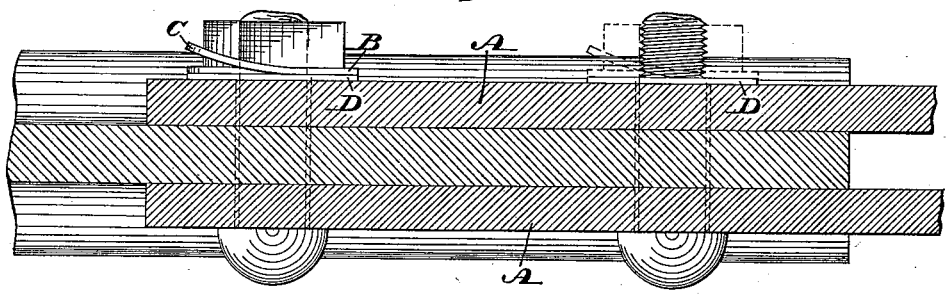
Figure 3:
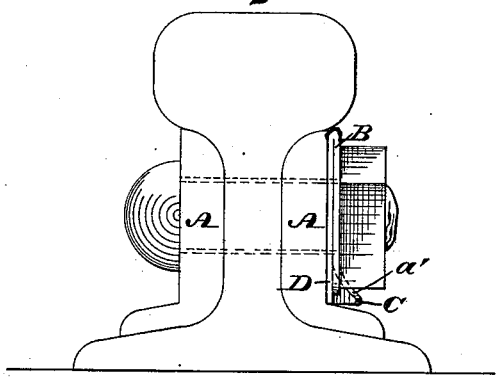
Figure 4:
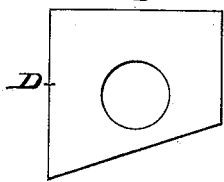
Figure 5:
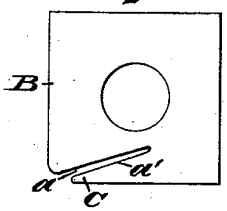
Figure 6:
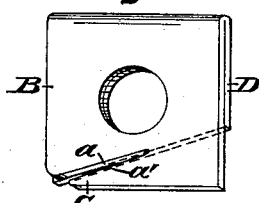

Figure 1 is a side elevation of a nut-fastener embodying my invention. Fig. 2 is a bottom view thereof. Fig. 3 is an end view thereof. Fig. 4 is a section of the fastener, showing the back plate thereof. Fig. 5 is a view of the front plate thereof. Fig. 6 is a perspective view of the complete fastener.

Similar letters of reference indicate corresponding parts in the several figures.

My invention consists in certain improvements in a nut-fastener whereby the nut is securely held and unscrewing of the same is readily accomplished, as will be hereinafter fully set forth.

Referring to the drawings, A represents a fish-plate or splice-piece, and B represents a metallic plate having an opening for the passage of the bolt. One of the sides of the plate is slit, as at $a$, at a tangent to a circle the diameter of which is equal to the smaller diameter of the nut, or the cut is made in a line perpendicular to the terminus of a radius of a circle the diameter of which is equal to the smaller diameter of the nut, thus forming a spring or locking lip, C, which is bent or turned outward, the inner edges, $a'$, of the said lip being coincident with the sides of the nut. Between the plate B and the fish-plate is a plate, D, which may be constructed of any shape, so long as it does not interfere with the motion of the locking-lip C when pressed inward or below the plane of the nut or face of contact with the plate B to permit the unscrewing of the said nut. The plate B, being angular and meeting the flange and base of the rail, is thus prevented from being rotated.

The plates B D are connected as one, and this is accomplished in the present case by making the two plates of one piece of metal, properly bent, as shown in Fig. 6, thus rendering the fastening strong and durable, as the rear plate acts as a re-enforce to the body of the front plate, the under plate, however, reaching to the tangential line $a'$, (see Fig. 6,) leaving sufficient space for the locking-lip.

It is readily seen that when the nut is rotated the rear or inner faces of its corner parts ride over and on the portions of the lip C beneath the nut, thus forcing back the lip. As soon as a corner of the nut clears the inner edge of the lip, the latter springs out and projects across the side of the nut, the inner edges, $a'$, engaging with the contiguous side of the nut, thus fastening the nut.

Should the nut become loosened, it is further rotated, and its rear face again rides over and presses the lip, another side of the nut then engaging with the edge $a'$ and locking the nut.

In order to unscrew the nut, the lip requires to be forced back in order to permit the passage of the nut thereover.

I am aware that it is not new to employ a plate provided with a spring-lip for holding or locking a nut, and disclaim the same, and I am also aware that it is not new to form a nut-fastener of two plates, one of which acts as a washer, and I also disclaim such feature; but I am not aware of any nut-fastener having the combined features hereinbefore presented by me; hence

I claim as new and as my invention—

A nut-fastener consisting of the two connected plates, B D, the outer plate having a spring-lip which extends tangentially to a circle whose diameter is equal to the smaller diameter of the nut, and the rear plate being entirely removed from said lip and re-enforcing the body of the front plate, substantially as described.

ISAAC BROOKE.

Witnesses:
JOHN A. WIEDERSHEIM,
A. P. GRANT.